United States Patent
Chino

(10) Patent No.: US 9,037,789 B2
(45) Date of Patent: May 19, 2015

(54) SENSING DEVICE AND ELECTRONIC APPARATUS

(75) Inventor: Taketo Chino, Hokuto (JP)

(73) Assignee: SEIKO EPSON CORPORATION (JP)

( * ) Notice: Subject to any disclaimer, the term of this patent is extended or adjusted under 35 U.S.C. 154(b) by 819 days.

(21) Appl. No.: 13/159,782

(22) Filed: Jun. 14, 2011

(65) Prior Publication Data

US 2012/0030419 A1    Feb. 2, 2012

(30) Foreign Application Priority Data

Jul. 30, 2010    (JP) .................... 2010-171616

(51) Int. Cl.
| G06F 12/00 | (2006.01) |
| G06F 13/00 | (2006.01) |
| G06F 13/28 | (2006.01) |
| G01D 3/02  | (2006.01) |

(52) U.S. Cl.
CPC ...................... G01D 3/022 (2013.01)

(58) Field of Classification Search
CPC ........................................ G01D 3/022
USPC .......................... 711/106, E12.001
See application file for complete search history.

(56) References Cited

U.S. PATENT DOCUMENTS

| 4,730,256 A * | 3/1988 | Niimi et al. ........ 701/115 |
| 5,227,981 A * | 7/1993 | Katsuki et al. ........ 700/299 |
| 6,848,053 B1 * | 1/2005 | Monzawa et al. ........ 726/18 |
| 7,868,918 B2 | 1/2011 | Kamiya et al. |
| 2002/0018403 A1 * | 2/2002 | Brandt et al. ........ 368/107 |
| 2003/0196137 A1 * | 10/2003 | Ahmad et al. ........ 714/13 |
| 2004/0096087 A1 * | 5/2004 | Funahashi ........ 382/124 |
| 2005/0252979 A1 * | 11/2005 | Konuma et al. ........ 235/492 |
| 2007/0176865 A1 | 8/2007 | Chino et al. |
| 2009/0062987 A1 * | 3/2009 | Kim et al. ........ 701/41 |
| 2009/0073141 A1 | 3/2009 | Chino |
| 2009/0284492 A1 | 11/2009 | Chino |
| 2010/0106294 A1 * | 4/2010 | Sugihara et al. ........ 700/245 |
| 2011/0302353 A1 * | 12/2011 | Confalonieri et al. ........ 711/103 |

FOREIGN PATENT DOCUMENTS

| JP | 2003-186739 A | 7/2003 |
| JP | 2006-235442 A | 9/2006 |
| JP | 2009-134071   | 6/2009 |
| JP | 2009-277116 A | 11/2009 |

* cited by examiner

*Primary Examiner* — Sheng-Jen Tsai
(74) *Attorney, Agent, or Firm* — Harness, Dickey & Pierce, P.L.C.

(57) ABSTRACT

A sensing device and an electronic apparatus in which impairment of performance due to destruction of parameters can be reduced are to be provided. Parameters (sensor parameters 1 to n (n≥1)) associated with sensors 1 to N (N≥1) are stored in a ROM. A memory control unit reads out the sensor parameters 1 to n from the ROM and writes the sensor parameters into the RAM, and after that, carries out refresh processing to read out the sensor parameters from the ROM and overwrite the RAM with the sensor parameters in predetermined timing. A processing unit carries out signal processing of the sensors 1 to N based on the sensor parameters 1 to n written in the RAM.

9 Claims, 10 Drawing Sheets

SENSING DEVICE AND ELECTRONIC APPARATUS

BACKGROUND

1. Technical Field

The present invention relates to a sensing device and an electronic apparatus.

2. Related Art

Recently, many types of sensors are developed and installed in various systems and electronic apparatuses. For example, there is a system to detect the attitude of an object using a sensing device equipped with an acceleration sensor, gyro sensor, geomagnetic sensor, temperature sensor or the like.

A commonly used sensing device includes a sensor module including plural sensors, a microcomputer, a ROM, a RAM and the like. Parameters for each sensor (for example, a correction parameter to correct a detection error caused by characteristics of the sensor, and so on) are written in the ROM. For example, at the time of initialization such as at the time of startup after power is turned on, the microcomputer reads out parameters from the ROM and writes the parameters into the RAM. After that, the microcomputer carries out, at high speeds, various kinds of processing (for example, processing to correct detection errors due to characteristics of the sensor, and the like) related to each sensor using parameters written in the RAM.

JP-A-2009-134071 is an example of related art.

However, parameters written in the RAM can be destroyed by noise or the like. When parameters are destroyed, problems may occur in the subsequent operations of the sensing device. For example, when the correction parameter written in the RAM is destroyed, wrong correction processing may be carried out and the performance of the sensing device may be impaired.

SUMMARY

An advantage of some aspects of the invention is to provide a sensing device and an electronic apparatus in which the impairment of performance due to the destruction of parameters can be reduced.

(1) An aspect of the invention is directed to a sensing device including: a sensor; a non-volatile first memory in which a parameter associated with the sensor is stored; a second memory; a memory control unit which, after reading out the parameter from the first memory and writing the parameter into the second memory, carries out refresh processing to read out the parameter from the first memory and overwrite the second memory with the parameter in predetermined timing; and a processing unit which carries out signal processing of the sensor based on the parameter written in the second memory.

The parameter associated with the sensor is, for example, a parameter for correcting bias offset (0-point offset) of the sensor, a parameter for correcting a detection error due to temperature characteristics of the sensor, and the like.

The predetermined timing in which the memory control unit carries out the refresh processing may be periodic timing (predetermined cycle) or may be irregular timing.

The signal processing carried out by the processing unit is, for example, processing to correct a detected value from the sensor on the basis of the parameter, and the like.

With the sensing device according to this aspect of the invention, the parameter written in the second memory is overwritten with the parameter stored in the first memory by the refresh processing. Therefore, even if the parameter written in the second memory is destroyed, the processing unit can carry out normal processing after the next refresh processing. Therefore, in the sensing device according to this aspect of the invention, impairment of performance due to the destruction of parameters can be reduced.

For example, the memory control unit may repeat the refresh processing on a predetermined cycle.

Thus, when parameter data written in the second memory is destroyed, the period when an abnormal processing result is generated can be restrained within one cycle of the refresh processing.

(2) This sensing device may further include a register unit. The memory control unit may receive refresh cycle information about the cycle of the refresh processing from the register unit and carry out the refresh processing on the cycle corresponding to the refresh cycle information.

Thus, the refresh processing can be carried out on an appropriate cycle corresponding to the environment of use of the sensing device, required accuracy and the like.

(3) This sensing device may further include an output unit which externally outputs output data from the processing unit. The cycle of the refresh processing may be equal to or shorter than a cycle of sampling the output data by an external device.

Thus, when parameter data written in the second memory is destroyed, abnormal data received by the external device can be limited to one sample only.

(4) In this sensing device, the memory control unit may compare a detected value from the sensor with a predetermined threshold and carry out the refresh processing based on the result of the comparison.

For example, the memory control unit may carry out the refresh processing when the detected value from the sensor (or its absolute value) is greater than the threshold (or equal to or greater than the threshold), and not carryout the refresh processing when the detected value from the sensor (or its absolute value) is equal to or smaller than the threshold (or smaller than the threshold). Conversely, the memory control unit may carry out the refresh processing when the detected value from the sensor (or its absolute value) is smaller than the threshold (or equal to or smaller than the threshold), and not carry out the refresh processing when the detected value from the sensor (or its absolute value) is equal to or greater than the threshold (or greater than the threshold).

Thus, the timing of the refresh processing can be controlled according to the detected value from the sensor. For example, when the detected value from a motion sensor such as an acceleration sensor or angular velocity sensor is relatively large, that is, when the amount of movement of the sensing device is relatively large, noise is considered to be larger. Therefore, the probability of destruction of parameter data written in the second memory becomes higher. Thus, by carrying out the refresh processing when the detected value from the motion sensor (or its absolute value) is greater than the threshold (or the detected value is equal to or greater than the threshold), impairment of performance due to the destruction of parameters can be reduced.

In the case where the sensing device has plural sensors, the memory control unit may, for example, select one sensor and compare the detected value from this sensor (or its absolute value) with a threshold. Alternatively, the memory control unit may carry out the refresh processing when at least one of the detected values from the plural sensors (or their absolute values) is greater than the threshold (or equal to or greater than the threshold), and not carry out the refresh processing when all the detected values from the plural sensors (or their absolute values) are equal to or smaller than the threshold (or smaller than the threshold). Conversely, the memory control unit may carry out the refresh processing when at least one of the detected values from the plural sensors (or their absolute values) is smaller than the threshold (or equal to or smaller than the threshold), and not carry out the refresh processing when all the detected values from the plural sensors (or their absolute values) are equal to or greater than the threshold (or greater than the threshold).

(5) In this sensing device, the memory control unit may carry out the refresh processing when the result of the comparison shows that the detected value from the sensor continues to be greater than the threshold for a predetermined time.

For example, the memory control unit may carry out the refresh processing when the detected value from the sensor (or its absolute values) continues to be greater than the threshold (or equal to or greater than the threshold) for a predetermined time, and not carry out the refresh processing when the detected value from the sensor (or its absolute value) becomes equal to or smaller than the threshold (or smaller than the threshold) before the predetermined time passes. Conversely, the memory control unit may carry out the refresh processing when the detected value from the sensor (or its absolute value) is smaller than the threshold (or equal to or smaller than the threshold) for a predetermined time, and not carry out the refresh processing when the detected value from the sensor (or its absolute value) becomes equal to or greater than the threshold (or greater than the threshold) before the predetermined time passes.

(6) In this sensing device, when the result of the comparison is a first result of comparison, the memory control unit may start the refresh processing and repeat the refresh processing on a predetermined cycle until the result of the comparison becomes a second result of comparison.

For example, the memory control unit may start the refresh processing when the detected value from the sensor (or its absolute value) becomes greater than the threshold (or equal to or greater than the threshold), and carry out the refresh processing periodically on a predetermined cycle until the detected value from the sensor (or its absolute value) becomes equal to or smaller than the threshold (or smaller than the threshold). Conversely, the memory control unit may start the refresh processing when the detected value from the sensor (or its absolute value) becomes smaller than the threshold (or equal to or smaller than the threshold), and carry out the refresh processing periodically on a predetermined cycle until the detected value from the sensor (or its absolute value) becomes equal to or greater than the threshold (or greater than the threshold).

Thus, the timing of carrying out the periodical refresh processing can be controlled according to the detected value from the sensor.

The comparison between the detected value from the sensor and the threshold may be made to have hysteresis. For example, the memory control unit may start the refresh processing when the detected value from the sensor (or its absolute value) becomes greater than a first threshold (or equal to or greater than the first threshold), and carry out the periodical refresh processing on a predetermined cycle until the detected value from the sensor (or its absolute value) becomes equal to or smaller than a second threshold (or smaller than the second threshold). Conversely, the memory control unit may start the refresh processing when the detected value from the sensor (or its absolute value) becomes smaller than the first threshold (or equal to or smaller than the first threshold), and carry out the periodical refresh processing on a predetermined cycle until the detected value from the sensor (or its absolute value) becomes equal to or greater than the second threshold (or greater than the second threshold).

(7) In this sensing device, the memory control unit may read out the parameter from the first memory, read out the parameter from the second memory, carry out determination processing to determine whether the two parameters are coincident with each other or not, and carry out the refresh processing when the parameters are not coincident.

Thus, unnecessary refresh processing where the parameter from the first memory and the parameter from the second memory are coincident with each other is not carried out, and therefore power consumption involved in memory access can be reduced.

(8) In this sensing device, a plurality of the parameters is stored in the first memory. The memory control unit may carry out the determination processing on at least one of the plural parameters, and when a parameter that is not coincident is found, the memory control unit may not carry out the determination processing on the other parameters and may carry out refresh processing on all the parameters.

Thus, when any one parameter that is not coincident between the first memory and the second memory is found, the determination processing on the other parameters is not carried out and therefore the determination processing can be faster.

(9) In this sensing device, a plurality of the parameters is stored in the first memory. The memory control unit may carry out the determination processing on each of the plural parameters and carry out the refresh processing on a parameter that is not coincident.

Thus, since only the parameter that is not coincident between the first memory and the second memory is the target of the refresh processing, the refresh processing can be faster and power consumption involved in memory access can be reduced.

(10) In this sensing device, the memory control unit may receive refresh permission information about whether to permit the refresh processing or not, and carry out the refresh processing when the refresh processing is permitted by the refresh permission information.

Thus, the timing of turning on and off the refresh function can be controlled.

(11) Another aspect of the invention is directed to an electronic apparatus including one of the sensing devices described above.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, preferred embodiments of the invention will be described in detail with reference to the drawings. The following embodiments should not unduly limit the contents of the invention described in the claims. All the elements of the configurations described below are not essential components of the invention, either.

1. Sensing Device
(1) First Embodiment
Configuration

Figure 1:
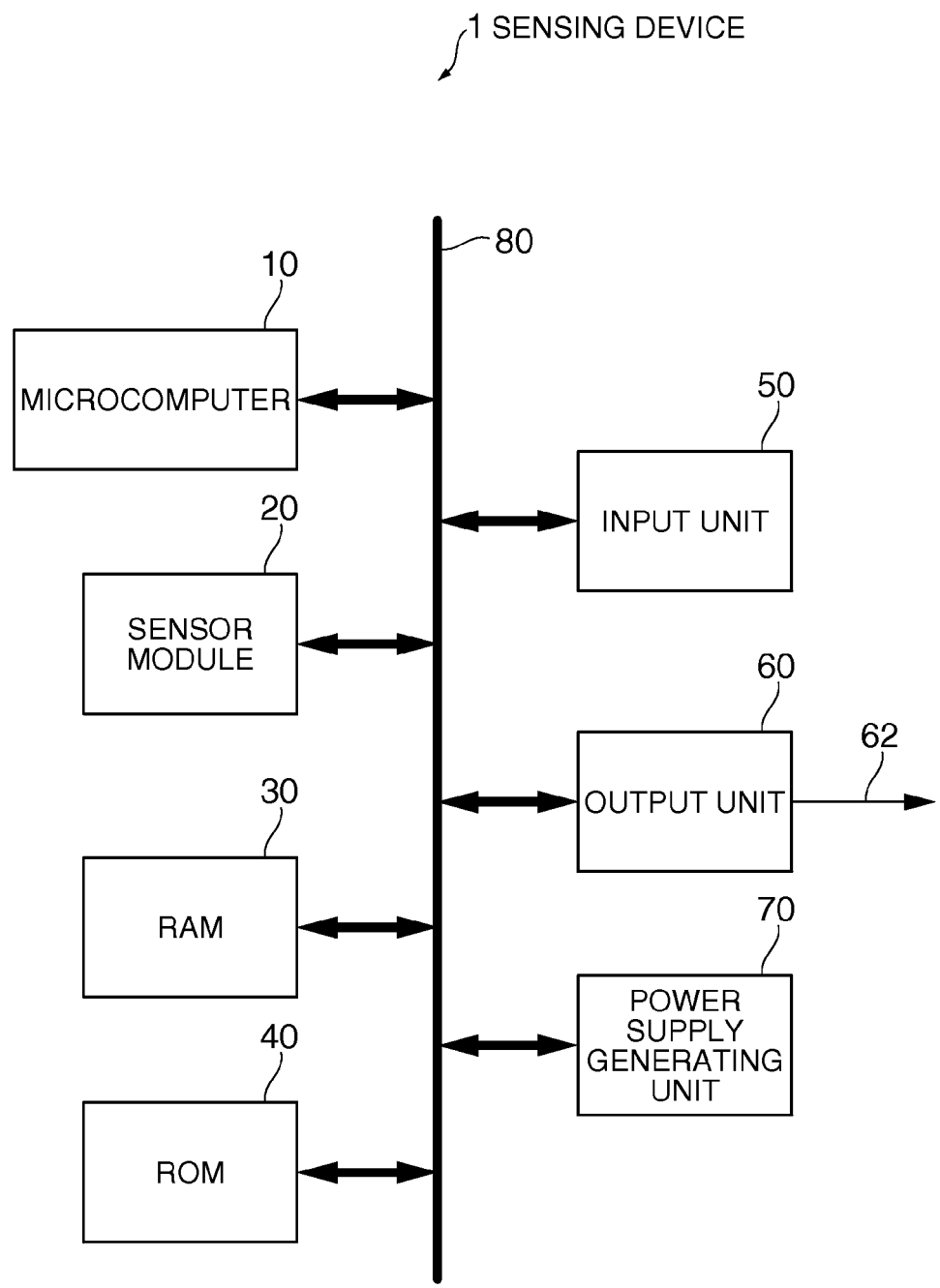
FIG. 1 shows the overall configuration of a sensing device according to an embodiment.

FIG. 1 shows the overall configuration of a sensing device according to this embodiment.

A sensing device 1 according to this embodiment includes a microcomputer 10, a sensor module 20, a random access memory (RAM) 30, a read only memory (ROM) 40, an input unit 50, an output unit 60, and a power supply generating unit 70. These components input and output addresses, data and the like to each other or in predetermined directions via a bus 80. The bus 80 may be, for example, $I^2C$ bus or SPI (serial peripheral interface) bus. The sensing device 1 of this embodiment may also have the configuration of FIG. 1 from which some of the components are omitted.

In the RAM 30 (an example of a second memory), programs, various parameters, temporary data or the like are stored. For example, a program and data used by the microcomputer 10 are temporarily stored in the RAM 30. The RAM 30 may be a volatile memory or non-volatile memory. However, it is desirable that the RAM 30 is accessible at a speed that is high enough to prevent impairment of the performance of the microcomputer 10.

The ROM 40 (an example of a first memory) is a non-volatile memory. Necessary programs for the sensing device 1 and various parameters are stored in the ROM 40.

Particularly in this embodiment, a parameter associated with sensors included in the sensor module 20 (hereinafter referred to as "sensor parameter" is stored in the ROM 40. The sensor parameter may be, for example, a parameter for correcting bias offset (O-point offset) of each sensor (offset correction parameter), a parameter for correcting a detection error due to temperature characteristics of each sensor (temperature correction parameter) or the like. The parameter is separately written in the ROM 40, for example, in property checks of the sensors carried out before the shipping of the sensing device 1.

The programs and data stored in the ROM 40 are written into the RAM 30 at the time of initialization of the sensing device 1 (at the time of startup after power is turned on, or the like). The microcomputer 10 carries out various kinds of processing using the programs and data written in the RAM 30. Particularly in this embodiment, the sensor parameter is written into the RAM 30 from the ROM 40 when the sensing device 1 is started up. The sensor parameter written in the RAM 30 is overwritten with the sensor parameter stored in the ROM 40 by the microcomputer 10 in predetermined timing, as will be described later.

The input unit 50 receives inputs from outside the sensing device 1.

The output unit 60 outputs signals outside the sensing device 1. For example, the output unit 60 outputs data calculated by the microcomputer 10 as an output signal 62.

The power supply generating unit 70 generates a power supply used by the sensing device 1. The power supply generating unit 70 can be formed, for example, as a regulator which generates an internal power supply for the sensing device 1 from an external power supply.

Figure 2:
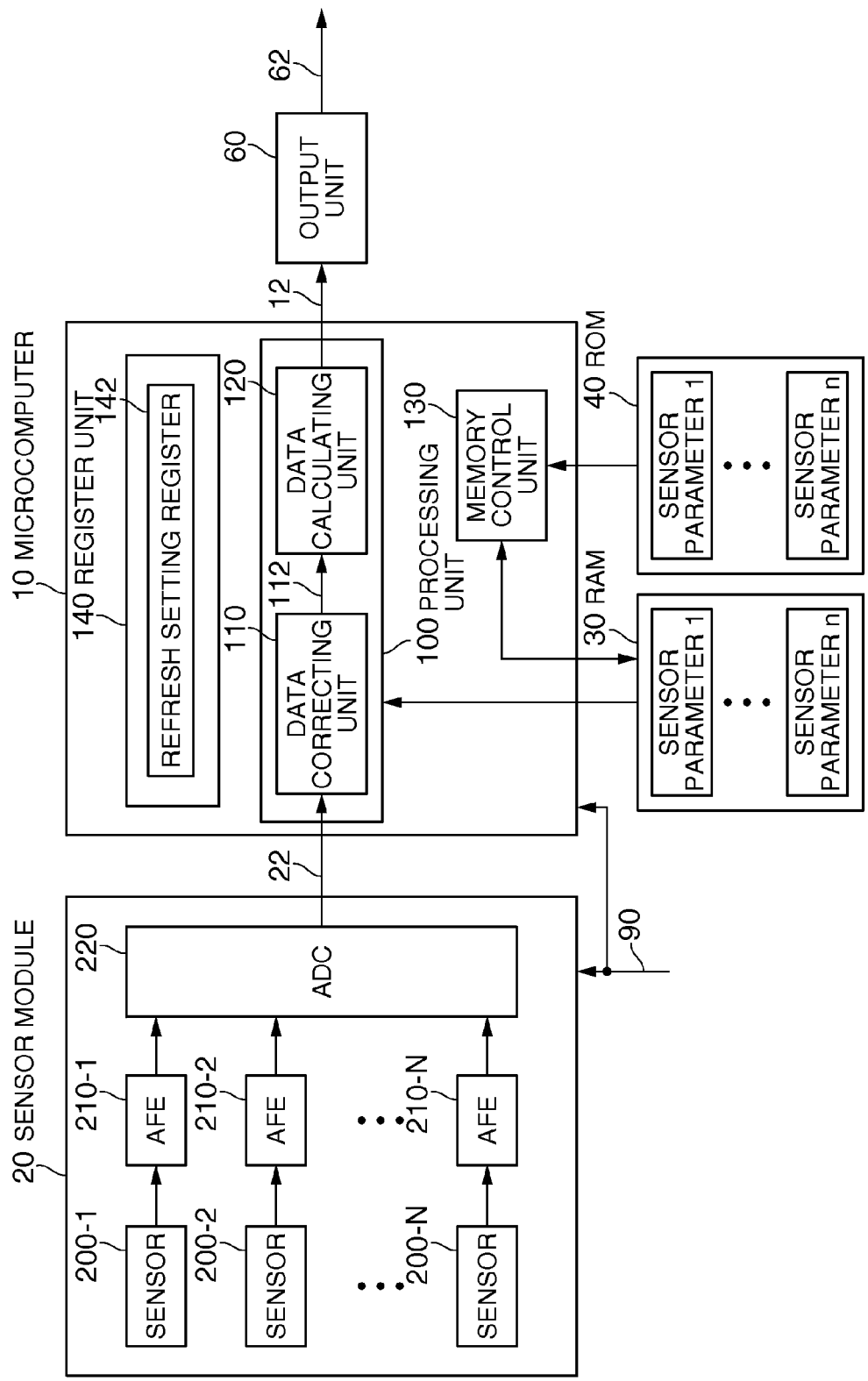
FIG. 2 is a view for explaining the detailed configuration of a microcomputer and a sensor module.

FIG. 2 is a view for explaining a more detailed configuration of the microcomputer 10 and the sensor module 20. In FIG. 2, the same components as in FIG. 1 are denoted by the same reference numerals.

In this embodiment, as shown in FIG. 2, sensor module and the microcomputer 10 carry out their respective processing synchronously with a common clock signal 90.

The sensor module 20 includes N (N≥1) sensor 200-1 to 200-N. Each of the sensors 200-1 to 200-N detects a predetermined physical quantity. The sensors 200-1 to 200-N output an analog signal corresponding to the detected physical quantity, for example, a DC voltage signal (detection signal) corresponding to the magnitude (or direction) of the physical quantity. The physical quantity may be acceleration, velocity, angular velocity, pressure, temperature, humidity, magnetism, or the like. Part of or all the sensors 200-1 to 200-N may be configured to detect the same kind of physical quantity. For example, the sensors 200-1 to 200-3 may form a triaxial gyro sensor (angular velocity sensor). The sensors 200-4 to 200-6 may form a triaxial acceleration sensor. The sensors 200-7 may be a temperature sensor.

The sensor module 20 also includes N analog front ends (AFE) 210-1 to 210-N connected to the latter part of the sensors 200-1 to 200-N. The AFEs 210-1 to 210-N carry out processing such as signal amplification or filtering of output signals (detection signals) from the sensors 200-1 to 200-N, respectively.

The sensor module 20 further includes an analog-digital converter (ADC) 220 connected to the latter part of the AFEs 210-1 to 210-N. The ADC 220 is a successive comparison-type ADC. The ADC 220 samples the output signals from the AFEs 210-1 to 210-N in order and converts the output signals to digital signals by time-division processing. That is, the ADC 220 time-divisionally outputs a digital value (detected value) expressing the physical quantity detected by each of the sensors 200-1 to 200-N. The output signal from the ADC 220 is transmitted to the microcomputer 10 as an output signal 22 of the sensor module 20.

In the sensor module 20, N ADCs may be connected to the latter part of the AFEs 210-1 to 210-N, respectively, and the detected values from the sensors 200-1 to 200-N may be transmitted to the microcomputer 10 in parallel.

The microcomputer 10 includes a processing unit 100. The processing unit 100 carries out processing related to the sensors 200-1 to 200-N based on n (n≥1) sensor parameters 1 to n written in the RAM 30.

For example, the processing unit 100 includes a data correcting unit 110 and a data calculating unit 120. The data correcting unit 110 receives the digital signal 22 outputted from the sensor module 20 (the output signal from the ADC 220, including the detected values from the sensors 200-1 to 200-N in a time-divisional manner) and corrects the detected values from the sensors 200-1 to 200-N using at least a part of the sensor parameters 1 to n written in the RAM 30.

Specifically, the data correcting unit 110 has a internal loop counter, not shown, and determines by which of the sensors 200-1 to 200-N each detected value included in the digital signal 22 is outputted, based on the count value of the loop counter. The data correcting unit 110 then corrects the detected values from the sensors 200-1 to 200-N using a part or all of the sensor parameters 1 to n.

For example, the data correcting unit 110 adds or subtracts values designated by N offset correction parameters, respectively, to or from the detected values from the sensors 200-1 to 200-N, and thereby corrects bias offset (O-point offset) of the sensors 200-1 to 200-N. Also, for example, the data correcting unit 110 corrects an error in the detected values due to the temperature characteristics of the sensors 200-1 to 200-N, using the ambient temperature of the sensors 200-1 to 200-N acquired by a temperature sensor, not shown, and N temperature correction parameters.

The data calculating unit 120 receives a digital signal 112 corrected by the data correcting unit 110 (including the N detected values acquired by correcting the detected values from the sensors 200-1 to 200-N, in order in a time-divisional manner) and carries out predetermined data calculation processing using the corrected N detected values. For example, in the case where the sensors 200-1 to 200-3 form a triaxial gyro sensor (angular velocity sensor), the sensors 200-4 to 200-6 form a triaxial acceleration sensor, and the sensors 200-7 is a temperature sensor, the data calculating unit 120 receives an angular velocity vector and an acceleration vector that are acquired by correcting an angular velocity vector detected by the triaxial gyro sensor and an acceleration vector detected by the triaxial acceleration sensor and carries out processing to calculate the attitude angle and position of the sensing device 1. The output signal from the data calculating unit 120 is transmitted to the output unit 60 as an output signal 12 of the microcomputer 10, and is outputted outside the sensing device 1 as an output signal 62.

The microcomputer 10 also includes a memory control unit 130. The memory control unit 130 reads out the sensor parameters 1 to n from the ROM 40 and writes the sensor parameters into the RAM 30, and after that, carries out processing to read out the sensor parameters 1 to n from the ROM 40 and overwrite the RAM 30 with the sensor parameters (hereinafter referred to as refresh processing).

The microcomputer 10 further includes a register unit 140. The register unit 140 includes various setting registers. The operations of the processing unit 100 (the data correcting unit 110, the data calculating unit 120 or the like) and the memory control unit 130 are controlled according to the set values of these setting registers.

Particularly in this embodiment, the register unit 140 includes a refresh setting register 142 to carry out various kinds of setting for refresh processing. The refresh setting register 142 includes at least a refresh permission bit (an example of refresh permission information) expressing whether to permit refresh processing or not (on and off of the refresh function) and a refresh cycle bit (an example of refresh cycle information) expressing the refresh cycle.

The memory control unit 130 receives the refresh permission bit of the refresh setting register 142 from the register unit 140, and carries out the refresh processing when the refresh processing is permitted by the refresh permission bit (when the refresh function is on).

The memory control unit 130 also receives the refresh cycle bit of the refresh setting register 142 from the register unit 140, and repeats the refresh processing on a predetermined cycle corresponding to the refresh cycle bit.

Timing of Data Generation

Figure 3:
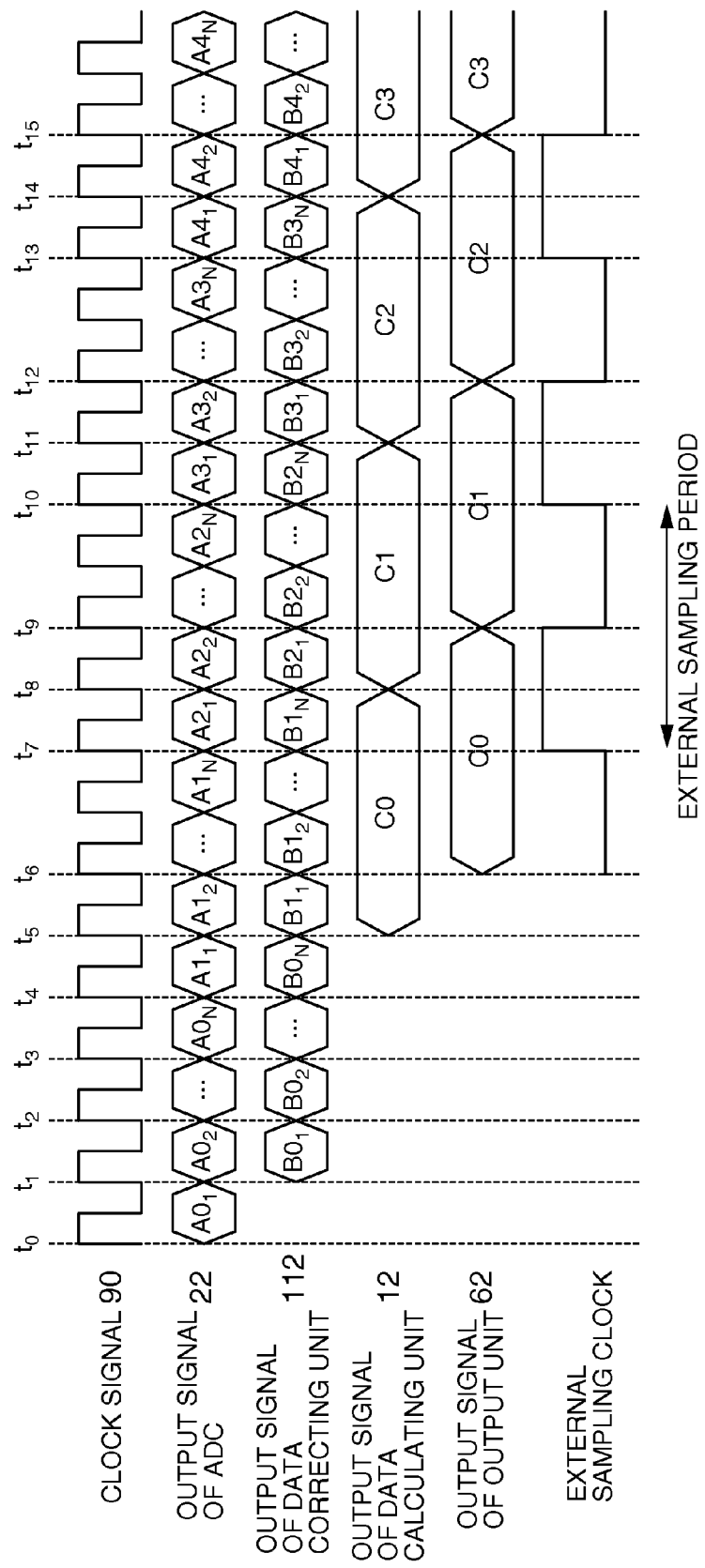
FIG. 3 is a timing chart showing an example of timing of data generation processing in the sensing device according to the embodiment.

FIG. 3 is a timing chart showing an example of timing of data generation processing in the sensing device of this embodiment.

As shown in FIG. 3, between times $t_0$ and $t_1$, the output signal 22 from the sensor module 20 (the output signal of the ADC 220) is data $A0_1$ expressing the detected value from the sensor 200-1. Between times $t_1$ and $t_2$, the output signal 112 from the data correcting unit 110 of the microcomputer 10 is data $B0_1$ acquired by correcting the data $A0_1$.

Between times $t_1$ and $t_2$, the output signal 22 from the sensor module 20 is data $A0_2$ expressing the detected value from the sensor 200-2. Between times $t_2$ and $t_3$, the output signal 112 from the data correcting unit 110 is data $B0_2$ acquired by correcting the data $A0_2$.

Similar processing is repeated. Between times $t_3$ and $t_4$, the output signal 22 from the sensor module 20 is data $A0_N$ expressing the detected value from the sensor 200-N. Between times $t_4$ and $t_5$, the output signal 112 from the data correcting unit 110 is data $B0_N$ acquired by correcting the data $A0_N$.

Between times $t_5$ and $t_8$, the data calculating unit 120 of the microcomputer 10 carries out predetermined calculation processing using the data $B0_1$ to $B0_N$ to generate data $C0$. The output signal 12 from the microcomputer 10 is now the data $C0$.

Between times $t_6$ and $t_9$, the output signal 62 from the output unit 60 is data $C0$. The data $C0$ is sampled at the rise of an external sampling clock at time $t_7$ by an external device, not shown, connected to the latter part of the sensing device 1.

Similarly, between times $t_4$ and $t_7$, the output signal 22 from the sensor module 20 is data $A1_1$ to $A1_N$ expressing the detected values from the sensors 200-1 to 200-N in order. Between times $t_5$ and $t_8$, the output signal 112 from the data correcting unit 110 is data $B1_1$ to $B1_N$ acquired by correcting the data $A1_1$ to $A1_N$ in order. Between times $t_8$ and $t_{11}$, the output signal 12 from the microcomputer 10 is data $C1$. Between $t_9$ and $t_{12}$, the output signal 62 from the output unit 60 is the data $C1$. The data $C1$ is sampled by the external device at the rise of the external sampling clock at time $t_{10}$.

Similarly, between times $t_7$ and $t_{10}$, the output signal 22 from the sensor module 20 is data $A2_1$ to $A2_N$ expressing the detected values from the sensors 200-1 to 200-N in order. Between times $t_8$ and $t_{11}$, the output signal 112 from the data correcting unit 110 is data $B2_1$ to $B2_N$ acquired by correcting the data $A2_1$ to $A2_N$ in order. Between times $t_{11}$ and $t_{14}$, the output signal 12 from the microcomputer 10 is data $C2$. Between $t_{12}$ and $t_{15}$, the output signal 62 from the output unit 60 is the data $C2$. The data $C2$ is sampled by the external device at the rise of the external sampling clock at time $t_{13}$.

Similar processing is carried out to the detected values from the sensors 200-1 to 200-N.

In the timing chart of FIG. 3, one data (for example, $C0$) is generated based on the detected values from the N sensors 200-1 to 200-N (for example, $A0_1$ to $A0_N$) in one cycle of the external sampling clock (external sampling period). That is, the external sampling period is N times the cycle of the clock signal 90.

The refresh cycle may be set to be equal to or shorter than the external sampling period by the refresh cycle bit of the refresh setting register 142. For example, if the external device is a device that carries out processing to rewrite a display screen at 60 Hz or 120 Hz and the external sampling period is 1/60 seconds or 1/120 seconds, the refresh cycle may be set to be equal to or shorter than 1/60 seconds or 1/120 seconds.

Refresh Processing

Figure 4:
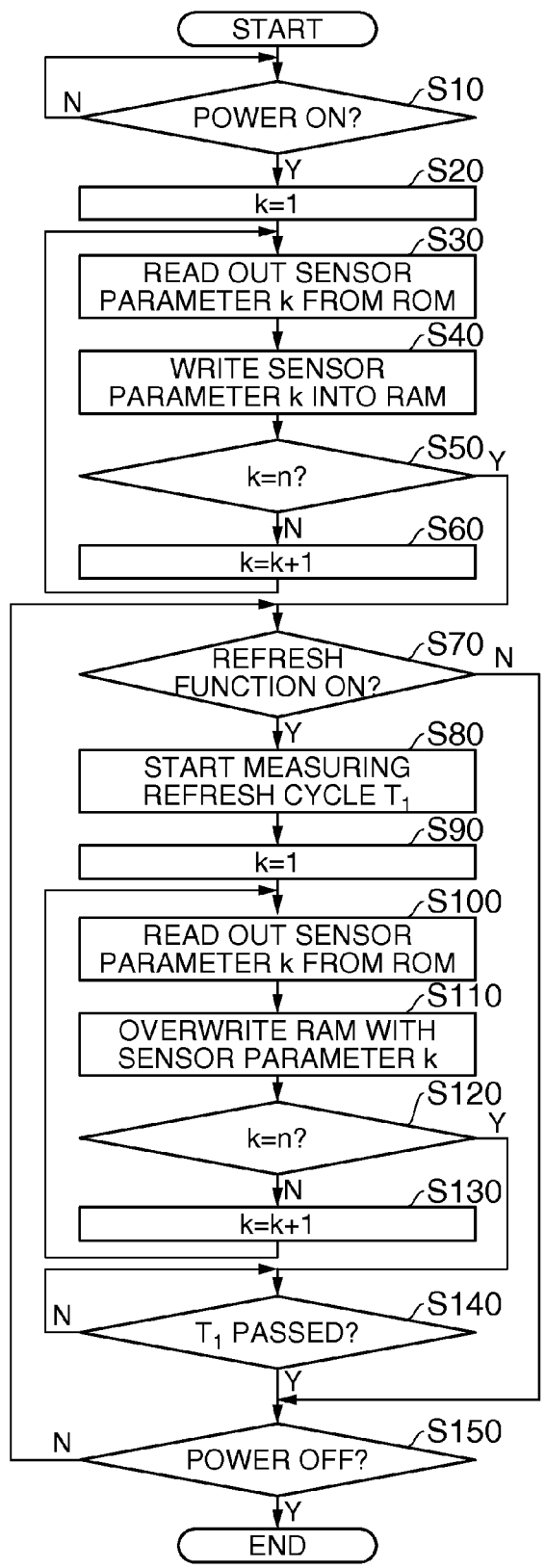
FIG. 4 is a flowchart showing procedures of refresh processing in a first embodiment.

FIG. 4 is a flowchart showing procedures of the refresh processing in the first embodiment.

As shown in FIG. 4, when power is on in the sensing device 1, the memory control unit 130 sets k=1 (step S20), then reads out a sensor parameter k from the ROM 40 (step S30), and writes the read-out sensor parameter k into the RAM 30 (step S40).

The processing of steps S30 and S40 is repeated with k incremented by 1 (step S60) until k=n is reached (until the result becomes Y in step S50). When k=n is reached (Y in step S50), the sensor parameters 1 to n are already written in the RAM 30.

The processing of steps S20 to S60 is equivalent to the initialization of the RAM 30.

Next, the memory control unit 130 determines whether the refresh function is on or off, based on whether the refresh permission bit of the refresh setting register 142 is 0 (not permit) or 1 (permit) (step S70).

When the refresh function is on (Y in step S70), the memory control unit 130 starts measuring the refresh cycle $T_1$ set by the refresh cycle bit of the refresh setting register 142 (step S80).

Next, the memory control unit 130 sets k=1 (step S90), then reads out the sensor parameter k from the ROM 40 (step S100), and overwrites the RAM 30 with the read-out sensor parameter k (step S110).

The memory control unit 130 then repeats the processing of steps S100 and S110 while incrementing k by 1 (step S130) until k=n is reached (until the result becomes Y in step S120). When k=n is reached (Y in step S120), the RAM 30 is already overwritten with the sensor parameters 1 to n.

The processing of steps S90 to S130 is equivalent to the refresh processing.

As the refresh cycle $T_1$ passes (Y in step S140) and when power is not off (N in step S150), the memory control unit 130 determines again whether the refresh function is on or off (step S70).

When the refresh function is on (Y in step S70), the memory control unit 130 starts measuring the refresh cycle $T_1$ (step S80) and carries out the refresh processing (processing of steps S90 to S130) again.

Subsequently, when the refresh function is on (Y in step S70), the refresh processing (processing of steps S90 to S130) is repeated on the predetermined cycle $T_1$ until power is turned off (until the result becomes Y in step S150).

In the sensing device according to the first embodiment as described above, the sensor parameters 1 to n written in the RAM 30 are overwritten with the sensor parameters 1 to n stored in the ROM 40, by the refresh processing. Therefore, even if sensor parameters written in the RAM 30 are destroyed, the processing unit 100 can carry out normal processing after the next refresh processing. Thus, with the sensing device according to the first embodiment, impairment of performance due to the destruction of sensor parameters can be reduced.

In the sensing device according to the first embodiment, the refresh processing is repeated on the predetermined cycle $T_1$. Therefore, when data of sensor parameters written in the RAM 30 is destroyed, the period when an abnormal processing result is generated can be restrained within the one cycle $T_1$.

Moreover, in the sensing device according to the first embodiment, the set value of the refresh cycle bit of the refresh setting register 142 is changed. Thus, the refresh processing can be carried out on an appropriate cycle corresponding to the environment of use of the sensing device, required accuracy and the like. For example, in the sensing device according to the first embodiment, the refresh cycle $T_1$ is set to be equal to or shorter than the external sampling period. Thus, when data of sensor parameters written in the RAM 30 is destroyed, abnormal data received by the external device can be limited to one sample only.

(2) Second Embodiment
Configuration

The overall configuration of a sensing device according to a second embodiment is similar to FIG. 1 and therefore will not be shown or described further in detail. The configuration of the microcomputer 10 and the sensor module in the second embodiment, too, is similar to the configuration shown in FIG. 2 and therefore will not be shown or described further in detail. However, the second embodiment is different from the first embodiment in the refresh processing by the memory control unit 130. Only this difference will be described.

The memory control unit 130 in the second embodiment reads out a sensor parameter k from the ROM 40 and also reads out a sensor parameter k from the RAM 30, and then carries out determination processing to determine whether the two sensor parameters are coincident with each other or not, in order from k=1. When a sensor parameter m that is not coincident is found, the memory control unit 130 does not carry out the determination processing on the other sensor parameters m+1 to n and carries out the refresh processing on all the sensor parameters 1 to n.

Refresh Processing

Figure 5:
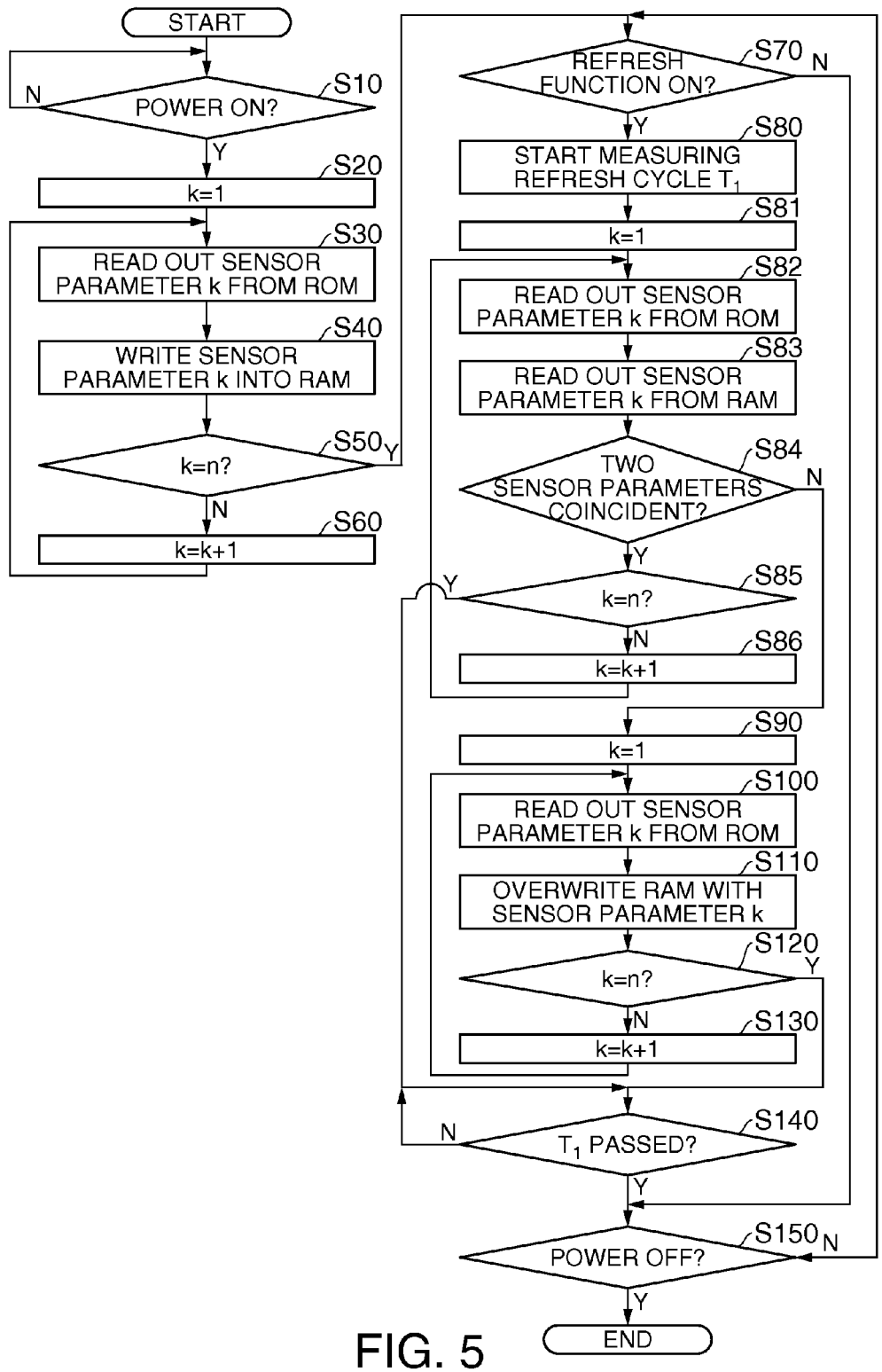
FIG. 5 is a flowchart showing procedures of refresh processing in a second embodiment.

FIG. 5 is a flowchart showing procedures of the fresh processing in the second embodiment. In FIG. 5, steps of carrying out similar processing to FIG. 4 are denoted by the same reference numerals and will be described only briefly or will not be described at all.

As shown in FIG. 5, when power is turned on in the sensing device 1, the memory control unit 130 carries out the initialization of the RAM 30 (processing of steps S20 to S60).

Next, the memory control unit 130 determines whether the refresh function is on or off (step S70). When the refresh function is on (Y in step S70), the memory control unit 130 starts measuring the refresh cycle $T_1$ (step S80).

Next, the memory control unit 130 sets k=1 (step S81), reads out the sensor parameter k from the ROM 40 (step S82), and also reads out the sensor parameter k from the RAM 30 (step S83).

The memory control unit 130 then determines whether the sensor parameter k read out from the ROM 40 and the sensor parameter k read out from the RAM 30 are coincident with each other or not (step S84). When the two sensor parameters are coincident (Y in step S84) and k=n does not hold (N in step S85), the memory control unit 130 increments k by 1 (step S86) and carries out the processing of steps S82 to S84 again.

When any sensor parameter k determined as not coincident in the determination processing of step S84 (N in step S84) is found, the memory control unit 130 carries out the refresh processing (processing of steps S90 to S130) on (all of) the n sensor parameters 1 to n.

As the refresh cycle $T_1$ passes (Y in step S140) and power is not off (N in step S150), the memory control unit 130 determines again whether the refresh function is on or off (step S70).

Meanwhile, in the case where a sensor parameter k determined as not coincident in the determination processing of step S84 (N in step S84) is not found (Y in step S85), when the refresh cycle $T_1$ passes (Y in step S140) and power is not off (N in step S150), the memory control unit 130 determines again whether the refresh function is on or off (step S70) without carrying out the refresh processing (processing of steps S90 to S130).

Subsequently, when the refresh function is on (Y in step S70), the determination processing of step S84 and the refresh processing (processing of steps S90 to S130) in the case of non-coincidence are repeated on the predetermined cycle $T_1$ until power is turned off (until the result becomes Y in step S150).

In the sensing device according to the second embodiment as described above, when at least one sensor parameter written in the RAM 30 is destroyed, all the sensor parameters 1 to n become overwritten with the sensor parameters 1 to n stored in the ROM 40 by the refresh processing. Therefore, the processing unit 100 can carry out normal processing after the refresh processing. Thus, with the sensing device according to the second embodiment, impairment of performance due to the destruction of sensor parameters can be reduced.

In the sensing device according to the second embodiment, unnecessary refresh processing is not carried out where the sensor parameters in the ROM 40 and the sensor parameters in the RAM 30 are coincident with each other. Therefore, power consumption involved in memory access can be reduced.

Moreover, in the sensing device according to the second embodiment, when at least one sensor parameter is found that is not coincident between the ROM 40 and the RAM 30, the determination processing on the other sensor parameters is not carried out. Therefore, the determination processing can be faster.

The effects shared with the first embodiment are not described further in detail.

(3) Third Embodiment
Configuration

The overall configuration of a sensing device according to a third embodiment is similar to FIG. 1 and therefore will not be shown or described further in detail. The configuration of the microcomputer 10 and the sensor module 20 in the third embodiment, too, is similar to the configuration shown in FIG. 2 and therefore will not be shown or described further in detail. However, the third embodiment is different from the first embodiment in the refresh processing by the memory control unit 130. Only this difference will be described.

The memory control unit 130 in the third embodiment reads out a sensor parameter k from the ROM 40 and also reads out a sensor parameter k from the RAM 30, and then carries out determination processing to determine whether the two sensor parameters are coincident with each other or not, in order from k=1. The memory control unit 130 carries out the refresh processing only on a sensor parameter k that is not coincident.

Refresh Processing

Figure 6:
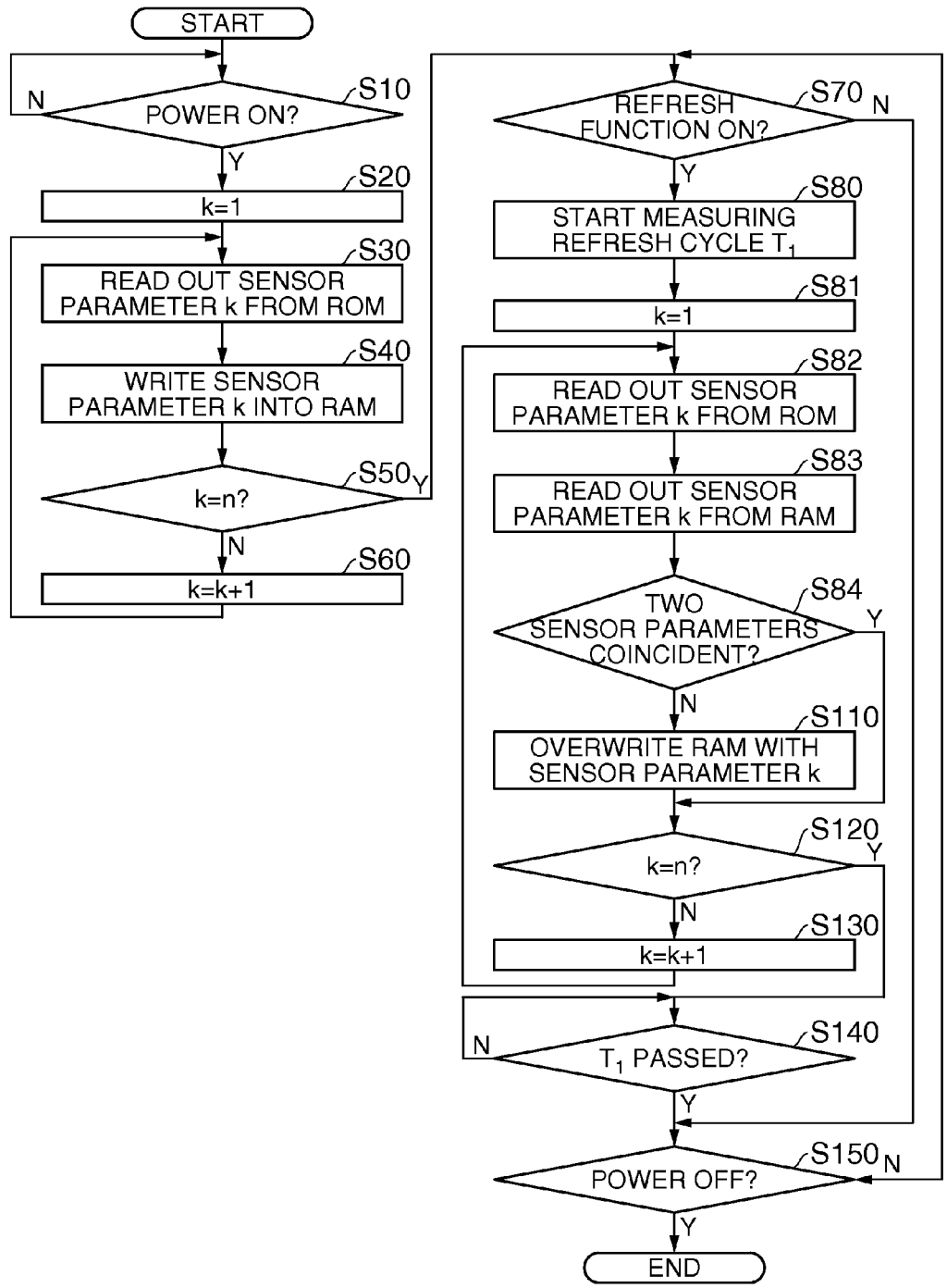
FIG. 6 is a flowchart showing procedures of refresh processing in a third embodiment.

FIG. 6 is a flowchart showing procedures of the fresh processing in the third embodiment. In FIG. 6, steps of carrying out similar processing to FIG. 4 or FIG. 5 are denoted by the same reference numerals and will be described only briefly or will not be described at all.

As shown in FIG. 6, when power is turned on in the sensing device 1, the memory control unit 130 carries out the initialization of the RAM 30 (processing of steps S20 to S60).

Next, the memory control unit 130 determines whether the refresh function is on or off (step S70). When the refresh function is on (Y in step S70), the memory control unit 130 starts measuring the refresh cycle $T_1$ (step S80).

Next, the memory control unit 130 sets k=1 (step S81), reads out the sensor parameters k from the ROM 40 and the RAM 30 (steps S82, S83), and then determines whether the sensor parameter k read out from the ROM 40 and the sensor parameter k read out from the RAM 30 are coincident with each other or not (step S84). When the two sensor parameters are not coincident (N in step S84), the memory control unit 130 overwrites the RAM 30 with the sensor parameter k read out from the ROM 40 (step S110).

Then, the memory control unit 130 repeats the processing of steps S82 to S110 while incrementing k by 1 (step S130) until k=n is reached (until the result becomes Y in step S120). When k=n is reached (Y in step S120), only the sensor parameter determined as not coincident in step S84 is overwritten in the RAM 30.

As the refresh cycle $T_1$ passes (Y in step S140) and power is not off (N in step S150), the memory control unit 130 determines again whether the refresh function is on or off (step S70).

Subsequently, when the refresh function is on (Y in step S70), the refresh processing (processing of steps S81 to S130) is repeated on the predetermined cycle $T_1$ until power is turned off (until the result becomes Y in step S150).

In the sensing device according to the third embodiment as described above, all the destroyed sensor parameters from among the sensor parameters 1 to n written in the RAM 30 become overwritten with the sensor parameters stored in the ROM 40 by the refresh processing. Therefore, the processing unit 100 can carry out normal processing after the refresh processing. Thus, with the sensing device according to the third embodiment, impairment of performance due to the destruction of sensor parameters can be reduced.

In the sensing device according to the third embodiment, unnecessary refresh processing is not carried out where the sensor parameters in the ROM 40 and the sensor parameters in the RAM 30 are coincident with each other. Therefore, power consumption involved in memory access can be reduced.

Moreover, in the sensing device according to the third embodiment, since only the sensor parameter that is not coincident between the ROM 40 and the RAM 30 is the target of the refresh processing, the refresh processing can be faster and power consumption involved in memory access can be reduced.

The effects shared with the first embodiment are not described further in detail.

(4) Fourth Embodiment
Configuration

The overall configuration of a sensing device according to a fourth embodiment is similar to FIG. 1 and therefore will not be shown or described further in detail. The configuration of the microcomputer 10 and the sensor module in the fourth embodiment, too, is similar to the configuration shown in FIG. 2 and therefore will not be shown or described further in detail. However, the fourth embodiment is different from the first embodiment in the refresh processing by the memory control unit 130. Only this difference will be described.

The memory control unit 130 in the fourth embodiment compares the absolute values of the detected values from the sensors 200-1 to 200-N with a predetermined threshold and carries out the refresh processing based on the result of the comparison. Specifically, the memory control unit 130 carries out the refresh processing when at least one of the absolute values of the detected values from the sensors 200-1 to 200-N is greater than the threshold.

In the fourth embodiment, the refresh setting register 142 includes at least a refresh permission bit and a threshold bit expressing the threshold to be compared with the detected values from the sensors 200-1 to 200-N.

Refresh Processing

Figure 7:
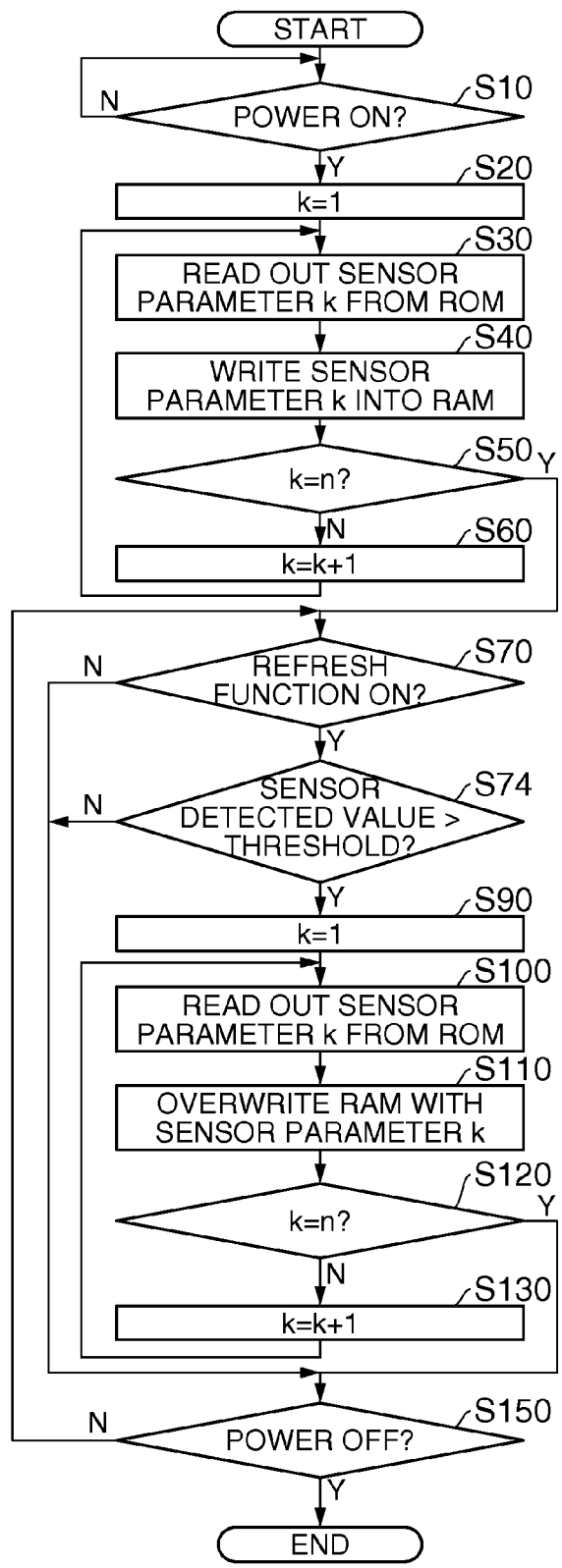
FIG. 7 is a flowchart showing procedures of refresh processing in a fourth embodiment.

FIG. 7 is a flowchart showing procedures of the fresh processing in the fourth embodiment. In FIG. 7, steps of carrying out similar processing to FIG. 4 are denoted by the same reference numerals and will be described only briefly or will not be described at all.

As shown in FIG. 7, when power is turned on in the sensing device 1, the memory control unit 130 carries out the initialization of the RAM 30 (processing of steps S20 to S60).

Next, the memory control unit 130 determines whether the refresh function is on or off (step S70). When the refresh function is on (Y in step S70), the memory control unit 130 determines whether the absolute value of the detected value from each of the sensors 200-1 to 200-N included in the output signal 22 of the sensor module 20 is greater than the threshold set by the threshold bit of the refresh setting register 142 or not (step S74).

When all the absolute values of the detected values from the sensors 200-1 to 200-N are equal to or smaller than the threshold (N in step S74) and power is not off (N in step S150), the memory control unit 130 determines again whether the refresh function is on or off (step S70).

Meanwhile, when at least one of the absolute values of the detected values from the sensors 200-1 to 200-N is greater than the threshold (Y in step S74), the memory control unit 130 carries out the refresh processing (processing of steps S90 to S130). Then, when power is not off (N in step S150), the memory control unit 130 determines again whether the refresh function is on or off (step S70).

Subsequently, when the refresh function is on (Y in step S70), the determination processing of step S74 and the refresh processing (processing of steps S90 to S130) where at least one of the absolute values of the detected values from the sensor 200-1 to 200-N is greater than the threshold are repeated until power is turned off (until the result becomes Y in step S150).

In the sensing device according to the fourth embodiment as described above, when at least one of the absolute values of the detected values from the sensors 200-1 to 200-N cyclically appearing in order in the output signal 22 of the sensor module 20 is greater than the threshold, all the sensor parameters 1 to n written in the RAM 30 become overwritten with the sensor parameters stored in the ROM 40 by the refresh processing. Therefore, the processing unit 100 can carry out normal processing after the refresh processing. Thus, with the sensing device according to the fourth embodiment, impairment of performance due to the destruction of sensor parameters can be reduced.

In the sensing device according to the fourth embodiment, the timing of the refresh processing can be controlled according to the detected values from the sensors 200-1 to 200-N. For example, if the sensors 200-1 to 200-N are motion sensors such as acceleration sensors or angular velocity sensors, when the detected values from the sensors are relatively large, that is, when the amount of movement of the sensing device is relatively large, noise is considered large. Therefore, the probability of data destruction of the sensor parameters written in the RAM 30 is high. Thus, by carrying out the refresh processing when the absolute values of the detected values from the motion sensors are greater than the threshold, impairment of performance due to the destruction of sensor parameters can be reduced.

The effects shared with the first embodiment are not described further in detail.

(5) Fifth Embodiment

Configuration

The overall configuration of a sensing device according to a fifth embodiment is similar to FIG. 1 and therefore will not be shown or described further in detail. The configuration of the microcomputer 10 and the sensor module 20 in the fifth embodiment, too, is similar to the configuration shown in FIG. 2 and therefore will not be shown or described further in detail. However, the fifth embodiment is different from the first embodiment in the refresh processing by the memory control unit 130. Only this difference will be described.

The memory control unit 130 in the fifth embodiment compares the absolute values of the detected values from the sensors 200-1 to 200-N with a predetermined threshold and carries out the refresh processing based on the result of the comparison over a predetermined time. Specifically, the memory control unit 130 carries out the refresh processing when at least one of the absolute values of the detected values from the sensors 200-1 to 200-N continues to be greater than the threshold for a predetermined time.

In the fifth embodiment, the refresh setting register 142 includes at least a refresh permission bit, a threshold bit, and a comparison time bit expressing the time during which the absolute values of the detected values from the sensors 200-1 to 200-N are compared with the threshold.

Refresh Processing

Figure 8:
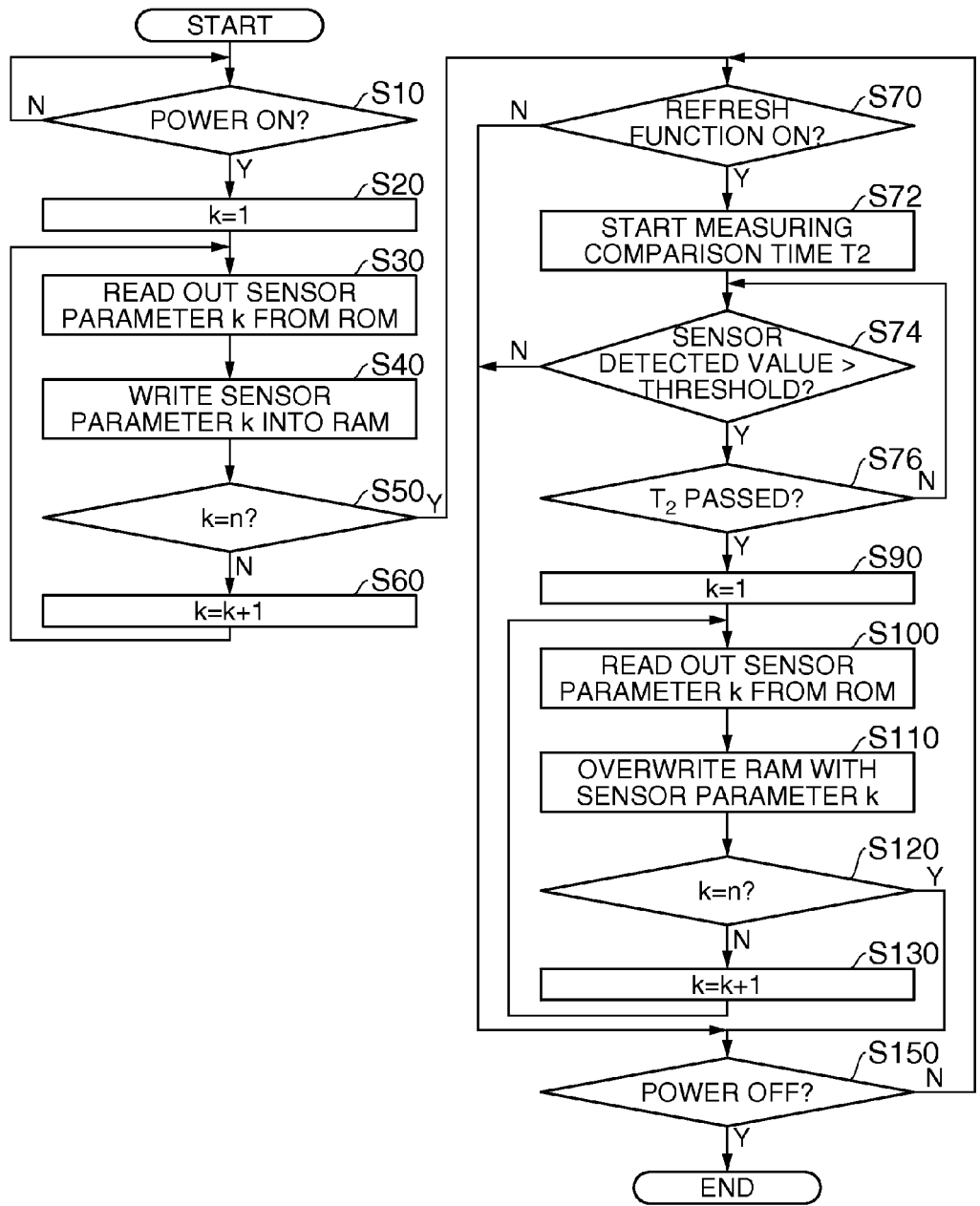
FIG. 8 is a flowchart showing procedures of refresh processing in a fifth embodiment.

FIG. 8 is a flowchart showing procedures of the fresh processing in the fifth embodiment. In FIG. 8, steps of carrying out similar processing to FIG. 7 are denoted by the same reference numerals and will be described only briefly or will not be described at all.

As shown in FIG. 8, when power is turned on in the sensing device 1, the memory control unit 130 carries out the initialization of the RAM 30 (processing of steps S20 to S60).

Next, the memory control unit 130 determines whether the refresh function is on or off (step S70). When the refresh function is on (Y in step S70), the memory control unit 130 stars measuring the comparison time $T_2$ set by the comparison time bit of the refresh setting register 142 (step S72).

Next, the memory control unit 130 determines whether the absolute value of the detected value from each of the sensors 200-1 to 200-N included in the output signal 22 of the sensor module 20 is greater than the threshold or not (step S74).

If all the absolute values of the detected values from the sensors 200-1 to 200-N become equal to or smaller than the threshold (N in step S74) before the comparison time $T_2$ passes (before the result is Y in step S76) and power is not off (N in step S150), the memory control unit 130 determines again whether the refresh function is on or off (step S70).

Meanwhile, when at least one of the absolute values of the detected values from the sensors 200-1 to 200-N is greater than the threshold (Y in step S74) until the comparison time $T_2$ passes (until the result becomes Y in step S76), the memory control unit 130 carries out the refresh processing (processing of steps S90 to S130). Then, when power is not off (N in step S150), the memory control unit 130 determines again whether the refresh function is on or off (step S70).

Subsequently, when the refresh function is on (Y in step S70) and at least one of the absolute values of the detected values from the sensors 200-1 to 200-N continues to be greater than the threshold during the comparison time $T_2$, the refresh processing (processing of steps S90 to S130) is repeated until power is turned off (until the result becomes Y in step S150).

In the sensing device according to the fifth embodiment as described above, when at least one of the absolute values of the detected values from the sensors 200-1 to 200-N cyclically appearing in order in the output signal 22 of the sensor module 20 continues to be greater than the threshold for the comparison period $T_2$ or longer, all the sensor parameters 1 to n written in the RAM 30 become overwritten with the sensor parameters stored in the ROM 40 by the refresh processing. Therefore, the processing unit 100 can carry out normal processing after the refresh processing. Thus, with the sensing device according to the fifth embodiment, impairment of performance due to the destruction of sensor parameters can be reduced.

The effects shared with the first or fourth embodiment are not described further in detail.

(6) Sixth Embodiment

Configuration

The overall configuration of a sensing device according to a sixth embodiment is similar to FIG. 1 and therefore will not be shown or described further in detail. The configuration of the microcomputer 10 and the sensor module 20 in the sixth embodiment, too, is similar to the configuration shown in FIG. 2 and therefore will not be shown or described further in detail. However, the sixth embodiment is different from the first embodiment in the refresh processing by the memory control unit 130. Only this difference will be described.

The memory control unit 130 in the sixth embodiment compares the absolute values of the detected values from the sensors 200-1 to 200-N with a predetermined threshold, then starts the refresh processing when the result of the comparison is a first result of comparison, and repeats the refresh processing on a predetermined cycle until the result of the comparison becomes a second result of comparison. Specifically, the memory control unit 130 starts the refresh processing when at least one of the absolute values of the detected values from the sensors 200-1 to 200-N is greater than a first threshold (an example of the first result of comparison), and repeats the refresh processing on a predetermined cycle until all the absolute values of the detected values from the sensors 200-1 to 200-N become smaller than a second threshold (an example of the second result of comparison). Here, the first threshold and the second threshold may be the same value or may be different values. For example, by making the second threshold smaller than the first threshold, the determination of start conditions and stop conditions for periodical refresh processing of the sensor parameters 1 to n can be made to have hysteresis.

In the sixth embodiment, the refresh setting register 142 includes at least a refresh permission bit, a refresh cycle bit, a first threshold bit expressing the first threshold to be compared with the absolute values of the detected values from the sensors 200-1 to 200-N, and a second threshold bit expressing the second threshold to be compared with the detected values of the sensors 200-1 to 200-N.

Refresh Processing

Figure 9:
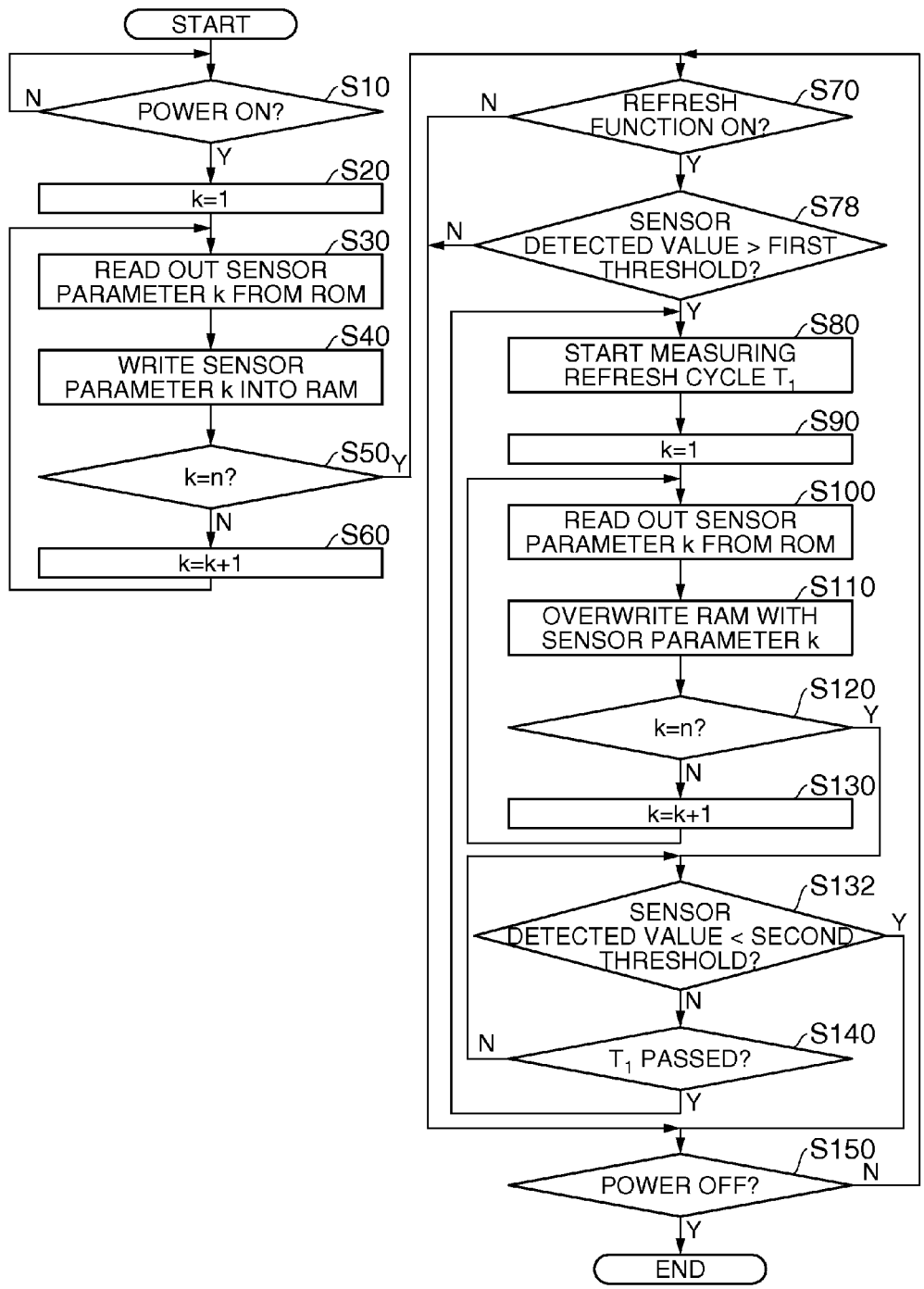
FIG. 9 is a flowchart showing procedures of refresh processing in a sixth embodiment.

FIG. 9 is a flowchart showing procedures of the refresh processing in the sixth embodiment. In FIG. 9, steps of carrying out similar processing to FIG. 4 or FIG. 7 are denoted by the same reference numerals and will be described only briefly or will not be described at all.

As shown in FIG. 9, when power is turned on in the sensing device 1, the memory control unit 130 carries out the initialization of the RAM 30 (processing of steps S20 to S60).

Next, the memory control unit 130 determines whether the refresh function is on or off (step S70). When the refresh function is on (Y in step S70), the memory control unit 130 determines whether the absolute value of the detected value from each of the sensors 200-1 to 200-N included in the output signal 22 of the sensor module 20 is greater than the first threshold set by the first threshold bit of the refresh setting register 142 or not (step S78).

When all the absolute values of the detected values from the sensors 200-1 to 200-N are equal to or smaller than the first threshold (N in step S78) and power is not off (N in step S150), the memory control unit 130 determines again whether the refresh function is on or off (step S70).

Meanwhile, when at least one of the absolute values of the detected values from the sensors 200-1 to 200-N is greater than the first threshold (Y in step S78), the memory control unit 130 starts measuring the refresh cycle $T_1$ (step S80) and carries out the refresh processing (processing of steps S90 to S130).

Next, the memory control unit 130 determines whether the absolute value of the detected value from each of the sensors 200-1 to 200-N included in the output signal 22 of the sensor module 20 is smaller than the second threshold set by the second threshold bit of the refresh setting register 142 or not (step S132).

When all the absolute values of the detected values from the sensors 200-1 to 200-N become smaller than the second threshold (Y in step S132) before the refresh cycle $T_1$ passes (before the result becomes Y in step S140) and power is not off (N in step S150), the memory control unit 130 determines again whether the refresh function is on or off (step S70).

Meanwhile, when at least one of the absolute values of the detected values from the sensors 200-1 to 200-N is greater than the second threshold (N in step S132) until the refresh cycle $T_1$ passes (until the result becomes Y in step S140), the memory control unit 130 starts measuring the refresh cycle $T_1$ (step S80) and carries out the refresh processing (processing of steps S90 to S130) again.

Subsequently, until power is turned off (until the result becomes Y in step S150) and when the refresh function is on (Y in step S70), every time at least one of the absolute values of the detected values from the sensors 200-1 to 200-N becomes greater than the first threshold, the refresh processing (processing of steps S90 to S130) is repeated on the predetermined cycle $T_1$ until all the absolute values of the detected values from the sensors 200-1 to 200-N become smaller than the second threshold.

In the sensing device according to the sixth embodiment as described above, when at least one of the absolute values of the detected values from the sensors 200-1 to 200-N cyclically appearing in order in the output signal 22 of the sensor module 20 becomes greater than the first threshold, all the sensor parameters 1 to n written in the RAM 30 become overwritten with the sensor parameters stored in the ROM 40 by the refresh processing. Therefore, the processing unit 100 can carry out normal processing after the refresh processing. Thus, with the sensing device according to the sixth embodiment, impairment of performance due to the destruction of sensor parameters can be reduced.

In the sensing device according to the sixth embodiment, periodical refresh processing can be arranged to be carried out only during the period after at least one of the absolute values of the detected values from the sensors 200-1 to 200-N becomes greater than the first threshold until all the absolute values of the detected values from the sensors 200-1 to 200-N become smaller than the second threshold.

The effects shared with the first or fourth embodiment are not described further in detail.

2. Electronic Apparatus

Figure 10:
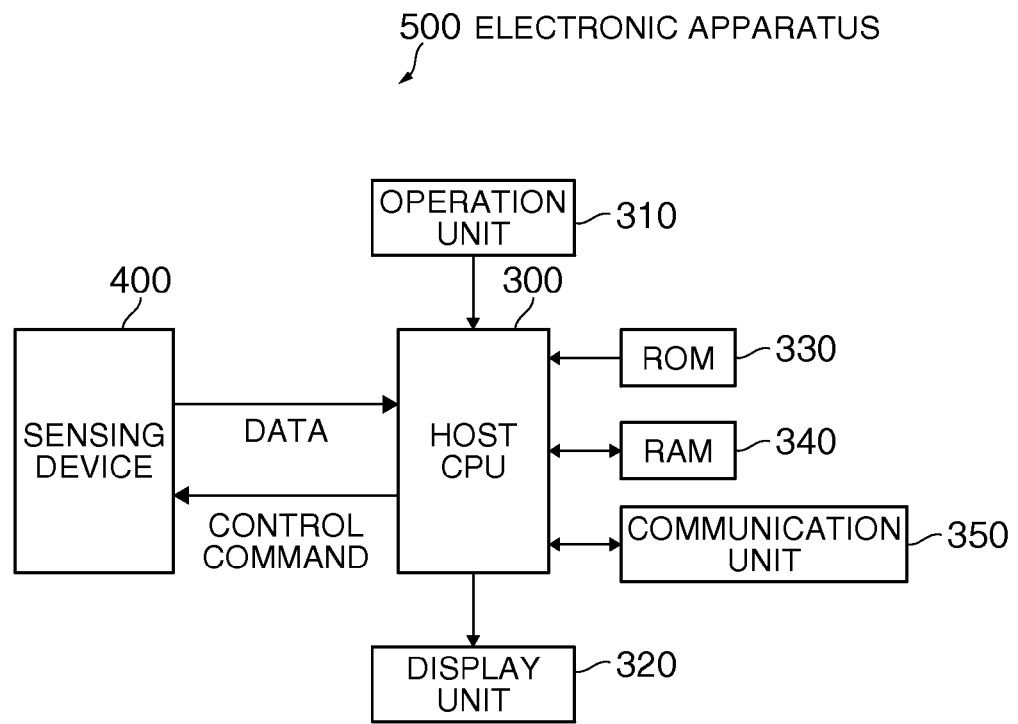
FIG. 10 is a functional block diagram showing an exemplary configuration of the embodiments.

FIG. 10 is a functional block diagram showing an exemplary configuration of an electronic apparatus including the sensing device according to the embodiments. An electronic apparatus 500 according to the embodiments includes a sensing device 400, a host CPU 300, an operation unit 310, a display unit 320, a ROM (read only memory) 330, a RAM (random access memory) 340, and a communication unit 350.

The host CPU (microcomputer) 300 carries out various kinds of calculation and control processing according to programs stored in the ROM 330. Specifically, the host CPU 300 transmits various control commands to the sensing device 400 to control the operation of the sensing device 400, or receives data from the sensing device 400 and carries out various kinds of calculation processing. The host CPU 300 also carries out various kinds of processing corresponding to operation signals from the operation unit 310, processing to transmit display signals for displaying various kinds of information on the display unit 320, processing to control the communication unit 350 in order to carry out external data communication, and so on.

The operation unit 310 is an input device including operation keys, button switches and the like, and outputs operation signals corresponding to user's operations to the host CPU 300.

The display unit 320 is a display device including an LCD (liquid crystal display) or the like, and displays various kinds of information (for example, navigation information and the like) based on display signals inputted from the host CPU 300.

In the ROM 330, programs for the host CPU 300 to carry out various kinds of calculation and control processing, and various application programs and data (for example, programs and data for navigation and attitude control) are stored.

The RAM 340 is used as a work area of the host CPU 300. Program and data read out from the ROM 330, data inputted from the operation unit 310, and results of calculations executed by the host CPU 300 according to various programs are temporarily stored in the RAM 340.

The communication unit 350 carries out various controls to establish data communication between the CPU 300 and an external device.

The sensing device 400 is, for example, one of the sensing devices according to the first to sixth embodiments. Sensor parameters in the internal RAM of the sensing device 400 are overwritten with sensor parameters in the internal ROM. By incorporating this sensing device 400, a more reliable electronic apparatus can be realized.

The electronic apparatus 500 may be various electronic apparatuses including an input apparatus such as a game controller or three-dimensional mouse, a toy such as a radio-controlled helicopter, a robot, a navigation device, a mobile phone, and a mobile personal computer.

The invention is not limited to the embodiments and various modifications can be made without departing from the scope of the invention.

For example, the second to sixth embodiments may be arbitrarily combined to modify the sensing device as long as there are no contradictions. For example, the refresh processing in one of the fourth to sixth embodiments may be replaced by the coincidence determination of sensor parameters between the RAM 30 and the ROM 40 and the refresh processing in the second embodiment or the third embodiment, thus modifying the sensing device.

The invention includes substantially the same configurations as the configurations described in the embodiments (for example, configurations having the same functions, methods and results, or configurations having the same objectives and effects). The invention also includes configurations replacing non-essential parts of the configurations described in the embodiments. The invention also includes configurations that have the same effects as the effects of the configurations described in the embodiments, or configurations that can achieve the same objectives. The invention further includes the configurations described in the embodiments with the addition of related art.

The entire disclosure of Japanese Patent Application No. 2010-171616, filed Jul. 30, 2010 is expressly incorporated by reference herein.

What is claimed is:

1. A sensing device comprising:
a sensor;
a non-volatile first memory in which a parameter associated with the sensor is stored;
a second memory;
a memory control unit that performs an initialization process in which the parameter from the first memory is read and written into the second memory when power is turned-on and performs a refresh process after the initialization process and before power is turned-off, during the refresh process, the memory control unit reads the parameter from the first memory and overwrites the second memory with the parameter;
a processing unit which carries out signal processing of the sensor based on the parameter written in the second memory;
a register unit that determines whether to permit a refresh function wherein, when the refresh function is permitted, the memory control unit is able to perform the refresh process and the register unit transmits a refresh cycle information to the memory control unit, and when the refresh function is not permitted, the memory control unit does not perform the refresh process; and
an output unit that externally outputs output data from the processing unit, which is sampled by an external device, wherein
the refresh cycle information outputted by the register unit includes information regarding a refresh cycle, the refresh cycle is less than or equal to a cycle of sampling of the output data by the external device, and
the memory control unit performs the refresh process when permitted by the register unit, and the memory control unit carries out the refresh process within the refresh cycle provided in the refresh cycle information.

2. The sensing device according to claim 1, wherein the memory control unit compares a detected value from the sensor with a predetermined threshold and carries out the refresh process based on a result of the comparison.

3. The sensing device according to claim 2, wherein the memory control unit carries out the refresh process when the result of the comparison shows that the detected value from the sensor continues to be greater than the threshold for a predetermined time.

4. The sensing device according to claim 2, wherein when the result of the comparison is a first result of comparison, the memory control unit starts the refresh process and repeats the refresh process on a predetermined cycle until the result of the comparison becomes a second result of comparison.

5. The sensing device according to claim 1, wherein the memory control unit reads out the parameter from the first memory, reads out the parameter from the second memory, carries out determination process to determine whether the two parameters are coincident with each other or not, and carries out the refresh process when the parameters are not coincident.

6. The sensing device according to claim 5, wherein a plurality of the parameters is stored in the first memory, and
the memory control unit carries out the determination process on at least one of the plural parameters, and when a parameter that is not coincident is found, the memory control unit does not carry out the determination process on the other parameters and carries out the refresh process on all the parameters.

7. The sensing device according to claim 5, wherein a plurality of the parameters is stored in the first memory, and
the memory control unit carries out the determination process on each of the plural parameters and carries out the refresh process on a parameter that is not coincident.

8. The sensing device according to claim 1, wherein
the register unit outputs a refresh permission information about whether to permits the refresh process or not to the memory control unit, and the memory control unit carries out the refresh process when the refresh process is permitted by the refresh permission information.

9. An electronic apparatus including the sensing device according to claim 1.

* * * * *